United States Patent
Lee

(10) Patent No.: US 6,453,804 B1
(45) Date of Patent: Sep. 24, 2002

(54) HINGE ASSEMBLY FOR A DOOR OF KIMCHI STORAGE DEVICE

(75) Inventor: Young-gil Lee, Asan-shi (KR)

(73) Assignee: Mando Climate Control Corporation (KR)

( * ) Notice: Subject to any disclaimer, the term of this patent is extended or adjusted under 35 U.S.C. 154(b) by 0 days.

(21) Appl. No.: 10/072,311

(22) Filed: Feb. 8, 2002

(30) Foreign Application Priority Data

| Feb. 9, 2001 | (KR) | ............................................. | 01-6477 |
| Feb. 9, 2001 | (KR) | ............................................. | 01-6478 |
| Feb. 9, 2001 | (KR) | ............................................. | 01-6479 |

(51) Int. Cl.[7] .............................. A23L 1/00; F25B 1/00; F25B 29/00; C12H 1/00; F25D 15/00
(52) U.S. Cl. ............................. 99/470; 99/467; 99/483; 49/386; 165/206; 165/263; 62/331; 62/455; 312/405
(58) Field of Search .......................... 99/276, 331, 451, 99/357, 352–353, 467–472, 483, 486, 496, 534, 535; 49/386, 387, 397, 381; 16/246, 254, 270, 271, 267, 273, 286–289, 306, 386; 62/447, 455, 253, 331, 254, DIG. 13, 441, 414; 165/30, 60–64, 48.1, 447, 253, 254, DIG. 13; 219/400, 530, 531; 244/129.5; 160/235; 435/289.1, 291.1; 439/138

(56) References Cited

U.S. PATENT DOCUMENTS

| 4,601,446 | A | * | 7/1986 | Opsahl | .................... 244/129.5 |
| 5,116,274 | A | * | 5/1992 | Artwohl et al. | ............. 312/405 |
| 5,142,969 | A | * | 9/1992 | Chun | ........................ 99/470 X |
| 5,207,490 | A | * | 5/1993 | Kaspar et al. | .......... 312/405 X |
| 5,398,599 | A | * | 3/1995 | Woo | ......................... 99/470 X |
| 5,411,328 | A | * | 5/1995 | You | ....................... 312/405 X |
| 5,551,252 | A | * | 9/1996 | Lee | ............................. 62/441 |
| 5,771,788 | A | * | 6/1998 | Lee et al. | ................. 99/470 X |
| 5,822,925 | A | * | 10/1998 | McKinney et al. | ........... 49/386 |
| 5,842,508 | A | | 12/1998 | Krupke et al. | |
| 5,931,554 | A | | 8/1999 | Koopman | |
| 5,947,197 | A | * | 9/1999 | Lee et al. | ................. 99/483 X |
| 6,089,146 | A | * | 7/2000 | Nam et al. | .................... 99/468 |
| 6,253,668 | B1 | * | 7/2001 | Lee | .......................... 99/470 X |
| 6,378,249 | B1 | * | 4/2002 | Foss et al. | .................... 49/386 |

* cited by examiner

Primary Examiner—Timothy F. Simone
(74) Attorney, Agent, or Firm—Fish & Richardson P. C.

(57) ABSTRACT

The present invention relates to a hinge assembly for a door of a kimchi storage device which mounts a door opening and closing a storage chamber of the kimchi storage device on the upper surface of a body. There is provided an integral hinge assembly for a door of a kimchi storage device which can prevent the impact during door opening and closing operations and can prevent the damage of the door by interconnecting: a cover plate fixed to a body; a hinge housing in which there are inserted an elastic means, a support plate backing up the elastic means, a control plate controlling a springback force and a support member connected to the elastic means and supporting a force between the elastic means and a press member; a turn member connected with the press member and fixed to the door.

11 Claims, 12 Drawing Sheets

HINGE ASSEMBLY FOR A DOOR OF KIMCHI STORAGE DEVICE

BACKGROUND OF THE INVENTION

1. Field of the Invention

The present invention relates to a hinge assembly for a door of a kimchi storage device, and more particularly, to a hinge assembly for a door of a kimchi storage device which prevents opening and closing impact of a door and enables stable opening and closing by alleviating an opening and closing speed of the door by a springback force of an elastic means when mounting the door at an upper surface of the body of the kimchi storage device having a storage chamber and opening and closing the same, the door being rotated in one direction and opening and closing the storage chamber.

2. Description of the Related Art

As is generally known, in recent times, kimchi storage devices for exclusive use for kimchi, which can mature and preserve kimchi optimally by using the principles of a refrigerator are being commonly used.

The kimchi storage device is constituted in such a manner that it can mature kimchi adequately according to a seasonal variation and a user's taste and then preserve the taste of the well-matured kimchi for a long time at a proper temperature.

While a general refrigerator is constituted to open and shut a door laterally, it is common that such a kimchi storage device is provided with an upper open/shut type door having a small overall size which is hingeably fixed to the upper surface of the body and is moved longitudinally to and away from the open position.

FIG. 1 is a perspective view of a conventional kimchi storage device; FIG. 2 is an extended perspective view of the dissembled state of a hinge joint of FIG. 1; FIG. 3 is a side view of the hinge joint in the door-shut state; and FIG. 4 is a side view of the hinge joint in the door-open state.

As illustrated therein, two separate kimchi storage chambers 3 are provided in the body 6 of the kimchi storage device which forms the appearance. Two doors 5 are hinged to the upper end of the rear surface of the body 6 in order to open and shut these two kimchi storage chambers 3 by lifting them upwardly.

The control of all operations of the kimchi storage is performed in a control panel 7 provided at the front surface of the body 6.

Meanwhile, as illustrated in FIG. 2, a body hinge portion 20 rotatably supporting the door 5 is prepared at the upper end of the rear surface of the body 6. A door hinge portion 30 rotatably connected to the body hinge portion 20 is prepared at the back region of the door 5.

The body hinge portion 20 has a hinge bracket 21 of a predetermined length fixed to a top cover 15 and a hinge cover 25 blocking the back region of the hinge bracket 21. The hinge bracket 21 is disposed so that its upper end portion is protruded upwardly of the top cover 15. At both sides in the hinge axial direction of the hinge bracket 21, an axial coupling hole 28 for coupling a hinge axis 40 is formed. The hinge cover 25 is connected to the hinge bracket 21 in order to block the back region of the hinge bracket 21.

The door hinge portion 30 has a hinge containing portion 33 formed as a certain containing space in the back region and partially containing the upper region of the body hinge portion 20 and an axis connection portion 31 prepared as a certain space at both sides of the hinge containing portion 33 for connecting the hinge axis 40. The hinge containing portion 33 and the axial connection portion 31 are segregated from each other by both side walls of the hinge containing portion 33. At both side walls of the hinge containing portion 33, a turn axis hole 38 for communicating the hinge containing portion 33 and the axis connection portion 31 is formed so that it corresponds to the axial coupling hole 28 of the hinge bracket 21.

The hinge axis 40 is coupled to the axial coupling hole 28 formed at the hinge bracket 21 of the body hinge portion 20 from the axis connection portion 31 of the door hinge portion 30 via the turn axis hole 38.

By such a constitution, the door hinge portion 30 is rotatably connected to the body hinge portion 20 prepared at the upper end of the rear surface of the body 6, and thusly the door 5 is connected to the body 6 to rotatably open and shut the storage chambers 3.

However, in the conventional kimchi storage device, there is a problem that a bilateral movement of the door 5 occurs since an upper region of the body hinge portion 20 is contained in the hinge containing portion 33 of the door hinge portion 30 and both sides of the body hinge portion 20 are connected to rotatably support both inner side walls of the hinge containing portion 33 of the door 5.

In addition, since the hinge containing portion 33 containing the body hinge portion 20 is formed as a certain containing space at the back region of the door 5, the back region of an upper wall of the hinge containing portion 33 is contacted to the rear surface of the body hinge portion 20, that is, to the outer surface of the hinge cover 25 when the door 5 is opened. At this time, if the load of the door 5 is transferred to the contact portion to thus open the door 5 by force, the back region of the door 5 is damaged.

Furthermore, according to a hinge structure according to the conventional construction, since there is no particular structure for fixing and holding the door 5 when opening the door 5, the door 5 is brought to a fully shut position or to a fully open position. If the door 5 is not held on the way, the door 5 is rapidly shut by the self-weight of the door 5 for thereby giving an impact to the entire kimchi storage device.

SUMMARY OF THE INVENTION

It is, therefore, an object of the present invention to provide a hinge assembly for a door of a kimchi storage device which eliminates the need to prepare a hinge joint when forming a body or door by manufacturing a hinge assembly and assembling it between the body and the door instead of preparing a body hinge portion and a door hinge portion and interconnecting them in the conventional art, improves the production efficiency by simplifying a process, and prevents the opening and closing impact of the door to thus enable stable opening and closing operations by preventing the lateral movement of the door and alleviating the opening and closing speed of the door by the springback force of a spring member.

To achieve the above object, there is provided a kimchi storage device having a body formed with at least one storage chamber, an upper door rotatably disposed at the upper portion of the body through a hinge assembly and opening and closing the storage chamber and a cooling machine and heating machine for maturing and cooling kimchi in the storage chamber, the hinge assembly for a door, the hinge assembly comprising: a hinge housing fixed to one side of the body through a cover plate coupled to cover a compartment of which one side is open; a turn member fixed to the rear surface of the door and at the same time rotatably coupled to the upper end of the hinge housing by inserting a hinge axis into one end of said turn member;

a roller-shaped press member rotatably disposed at the upper end of the turn member through a roller axis; a support member slidably contacted to the press member through a polygonal sloping contact surface, disposed in the compartment of the hinge housing and formed with a spring insertion hole at the other side of the sloping contact surface; an elastic means inserted into the spring insertion hole of the support member in order to press the support member with respect to the press member; and a control plate operationally coupled to an adjusting screw penetratingly disposed outwardly of the hinge housing in order to control the springback force of the spring member while supporting the lower portion of the elastic means.

The elastic means is a pair of spring members.

In addition, the elastic means consists of a pair of first spring members inserted into the spring insertion hole of the support member and a pair of second spring members connected to these first spring members in series by the medium of a connection plate.

In addition, the elastic means is formed in a dual structure in which a pair of first spring members inserted into the spring insertion hole of the support member are inserted into one pair of second spring members with a length smaller than that of the first spring member.

BRIEF DESCRIPTION OF THE DRAWINGS

The above objects, features and advantages of the present invention will become more apparent from the following detailed description when taken in conjunction with the accompanying drawings, in which.

DETAILED DESCRIPTION OF THE PREFERRED EMBODIMENT

Figure 1:
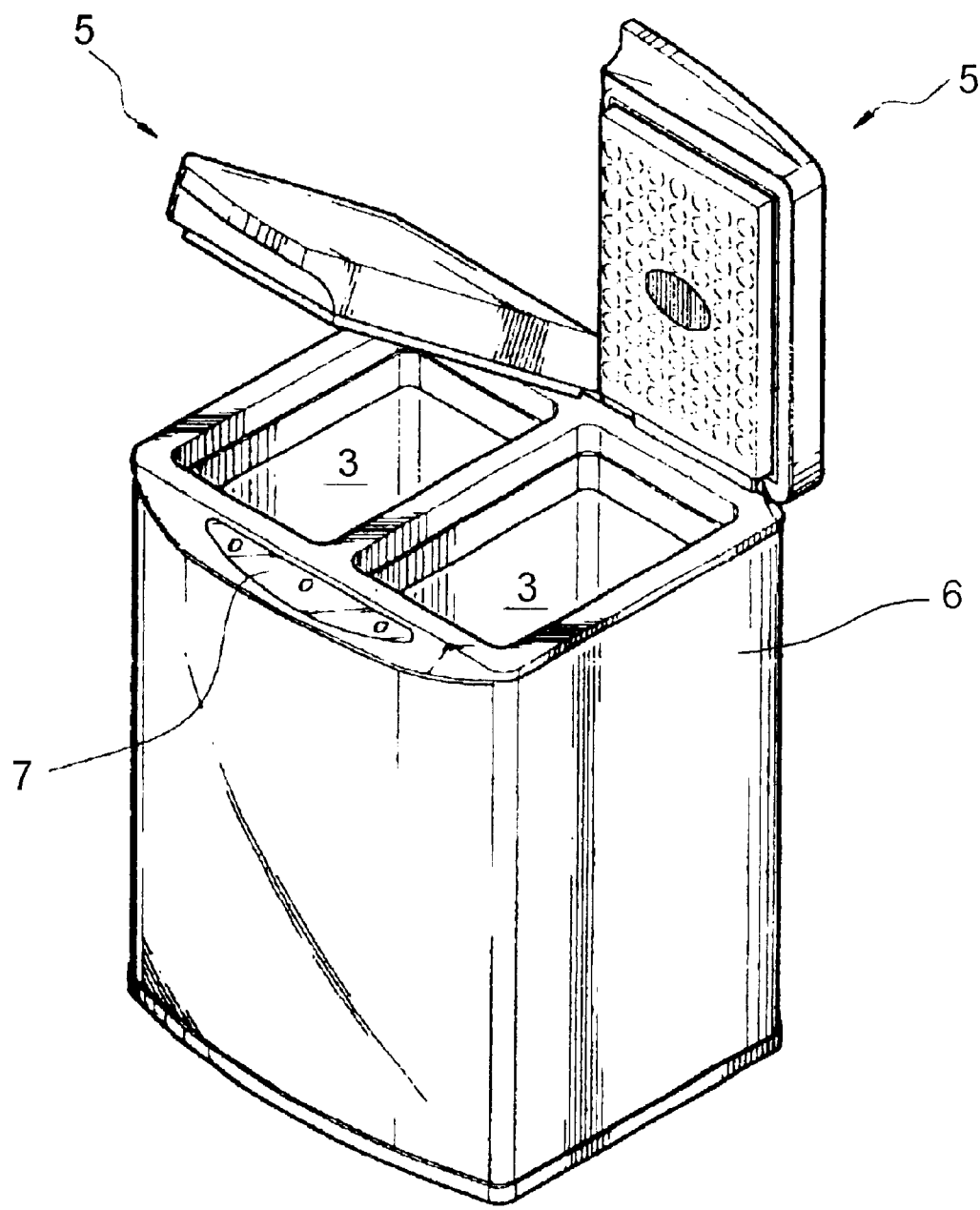
FIG. 1 is a perspective view of a conventional kimchi storage device.
Figure 2:
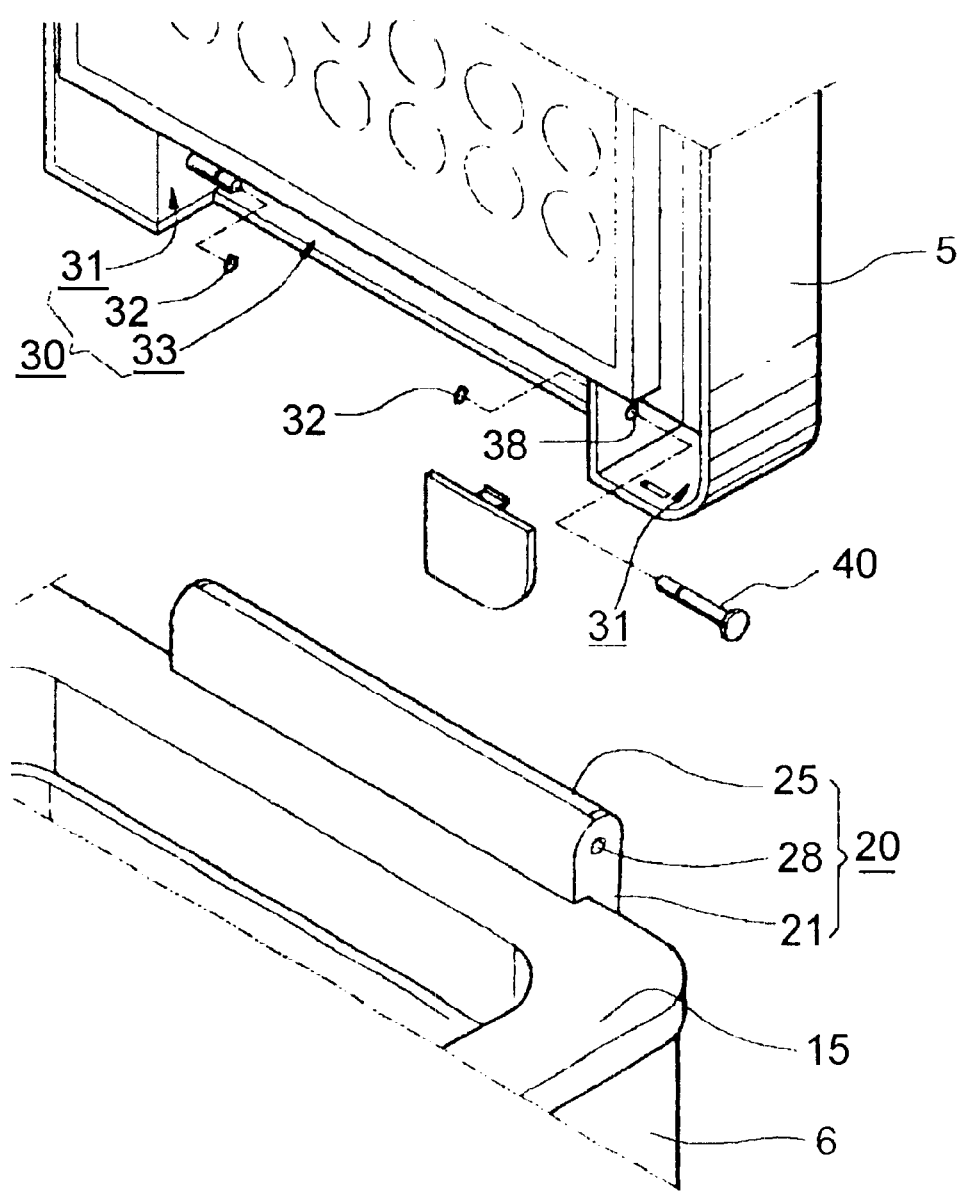
FIG. 2 is an expanded perspective view of the dissembled state of a hinge joint of the conventional kimchi.
Figure 3:
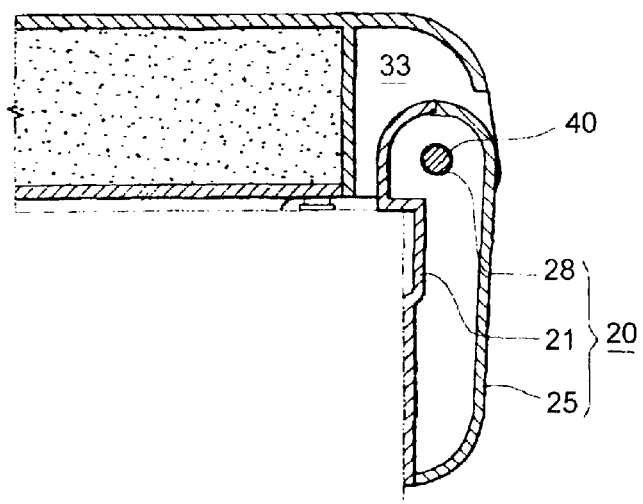
FIG. 3 is a side view of the hinge joint in the door-shut position of FIG. 2.
Figure 4:
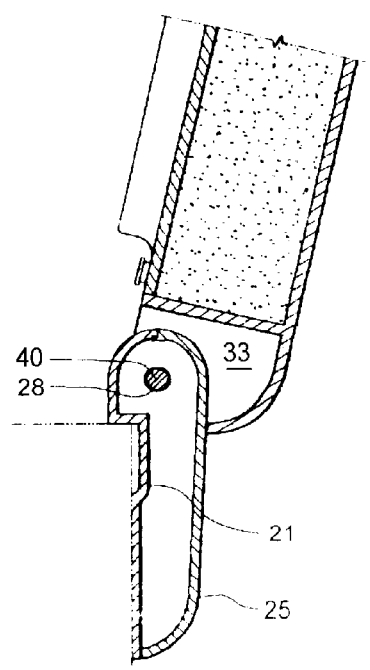
FIG. 4 is a side view of the hinge joint in the door-open position of FIG. 2.

Preferred embodiments of the present invention will now be described with reference to the accompanying drawings. In addition, the following embodiments do not limit the scope of rights of the present invention, but are suggested as an example. In the following description, same drawing reference numerals as the conventional art are used for the same elements.

Figure 5:
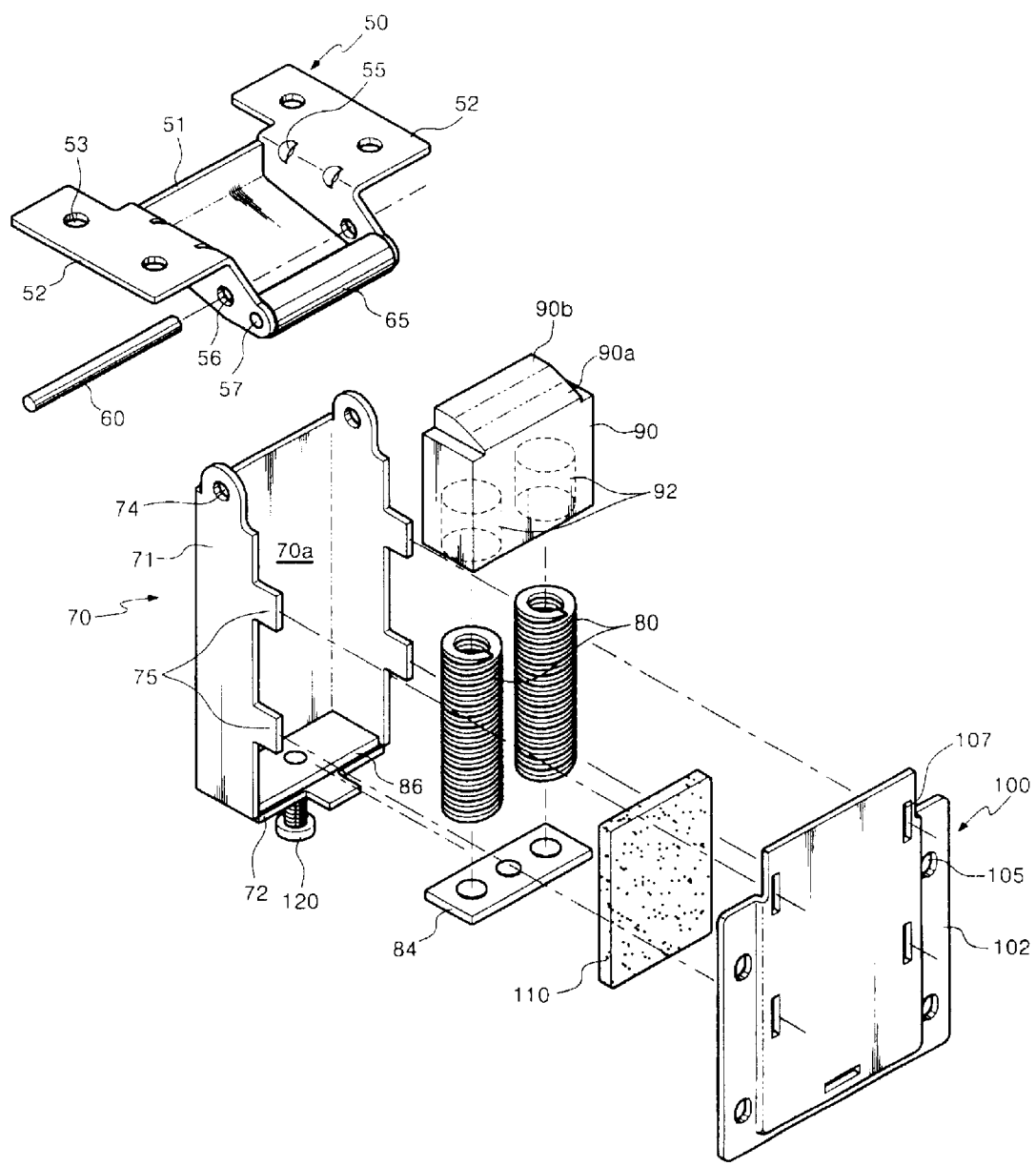
FIG. 5 is a perspective assembly view of a hinge assembly according to a first embodiment of the present invention.

FIG. 5 is a perspective assembly view of a hinge assembly according to a first embodiment of the present invention.

As illustrated therein, the hinge assembly according to the present invention includes a turn member 50 fixed to the door side, a hinge housing 70 forming a compartment 70a in a case shape, a roller-shaped press member 65 disposed at the turn member 50, a hexahedral support member 90 and a pair of spring members 80, said support member and spring members being placed in the compartment 70a of the hinge housing 70, a support plate 86, a control plate 84, and a cover plate 100 fixed to the body.

The turn member 50 fixed to the door side has a turn member body 51 with a door support flange 52 extending from the both ends of the turn member body 51 in a direction approximately perpendicular to opposite ends of the body 51 in spaced parallel relation. At the door support flange 52, first and second screw holes 53 for screwing fastening screw(s) are formed. At the portion horizontally extended and connected from the turn member body 51 to the door support flange 52 at a right angle, first and second reinforcing ribs 55 are formed to increase strength.

At lateral sides of the turn member body 51, first and second axial coupling holes 56 for coupling the hinge axis rotatable with the hinge housing 70 are formed. At the front end of the lateral sides, first and second pin holes 57 for rotatably coupling the roller-shaped press member 65 are formed.

The hinge housing 70 has a shape of an approximately cut case in which lateral sides 71 and a lower side 72 form a right angle, of which one side being open for hinge coupling with the turn member 50 and being formed with a projection that is curved and has an axial hole 74 at the edge of the lateral side 71. Along the front section of the lateral side 71, a plurality of engagement ribs 75 for engaging with the cover plate 100 are extruded integrally at predetermined intervals. At the lower side 72 of the hinge housing 70, an adjusting screw hole is formed in order to insert an adjusting screw 120.

The opened portion of the hinge housing 70 contains the portion having the axial coupling hole 56 of the turn member body 51. The hinge axis 60 passes through the turn member 50 via the axial coupling hole 56 of the turn member body 51 from the axial hole 74 of the hinge housing and then is coupled to the axial coupling hole 56 of the other side via the other axial hole 74 of the hinge housing 70. At this time, a washer is inserted between those bodies through which the hinge axis passes in consideration of friction and axial directional movement.

The thusly assembled hinge axis 60 serves as a turn axis of a door.

According to the above structure, by coupling the turn member 50 and the hinge housing 70 by the hinge axis 60, the turn member 50 becomes rotatable within a predetermined angle. Once the turn member 50 is moved toward the open position at an angle of up to 90 degrees and is rotated, it is rotated no more as outer surfaces of the turn member body 51 and hinge housing 70 are contacted with one another.

In addition, the roller-shaped press member 65 is rotatably coupled by an engaging pin between the pin holes 57 formed at the front end of the lateral sides of the turn member 50, that is, at the front end spaced at a predetermined distance from the axial coupling hole 56 assembled with the hinge axis 60. The width between the lateral sides of the turn member 50 to which the press member 65 is coupled must be smaller than the width of the compartment 70a formed between the lateral sides of the hinge housing 70.

Moreover, the compartment 70a of the hinge housing 70 is provided with a pair of spring members 80 having a springback force, a hexagonal support member 90 having a spring insertion hole 92 for insert-coupling one end of the spring member 80 while containing it and having a sloping contact surface curved at multiple angles, a support plate 86 for backing up the other free end of the spring member 80 and a control plate 84 for controlling the force of the spring member 80.

The sloping contact surface of the support member 90 becomes higher as it goes toward a second contact surface 90b at the back from a first contact surface 90a of the front when viewed from the front side, thereby forming a sloping shape, and it is contacted with the roller-shaped press member 65 connected to the front end of the turn member 50. At the rotation of the turn member 50, the press member 65 is slidably moved along the sloping contact surface of the support member 90 while maintaining a rolling contact and applies a force to the support member 90 supported by the spring member 80 due to the shape of the sloping contact surface.

At this time, it is preferable that the press member 65 and the support member 90 are manufactured by using resin material with excellent durability so that a frictional force can be minimized and a sliding motion can be easily performed.

The springback force of the spring member 80 can be controlled by the control plate 84 by clamping or unclamping the adjusting screw. When clamping the adjusting screw 120 coupled to the adjusting screw hole formed at the support plate 86 and the lower side 72 of the hinge housing 70, the control plate 84 is pushed upwardly to apply a force to the spring member 80 and compress it, for thereby increasing the springback force of the spring member 80.

The surfaces of the hinge housing 70 containing the spring member 80, the support member 90 and the like in the compartment 70a is covered by the cover plate 100.

At this time, the cover plate 100 serves to cover an open inner region of the hinge housing 70 and at the same time fix the hinge housing 70 to the body of the kimchi storage device, and it is provided with an engagement groove 107 for insertingly engaging a plurality of engaging ribs 75 extruded integrally along the front section of the lateral sides 71 of the hinge housing 70 and a body support flange 102 having a plurality of screw holes 105 for a screw assembly with the body of the kimchi storage device.

At this time, it is preferred that a buffer member 110 made of sponge material is inserted between the spring member 80 in the hinge housing 70 and the cover plate 100 in order to prevent a contact friction between the spring member 80 of which motion is relatively frequently changed and the inner surface of the cover plate 100 during the opening and closing of the door.

Furthermore, after the engagement groove 107 of the cover plate 100 is insertingly engaged to the engaging rib 75 of the hinge housing 70, the engaging rib 75 portion extruded to the outer surface of the cover plate 100 is pressed so that it can be contacted with the outer surface of the cover plate 100 in parallel, thereby increasing the robustness of the engagement and making the engaging rib 75 easily fixed and mounted to the flat rear surface of the body of the kimchi storage device.

Figure 6:
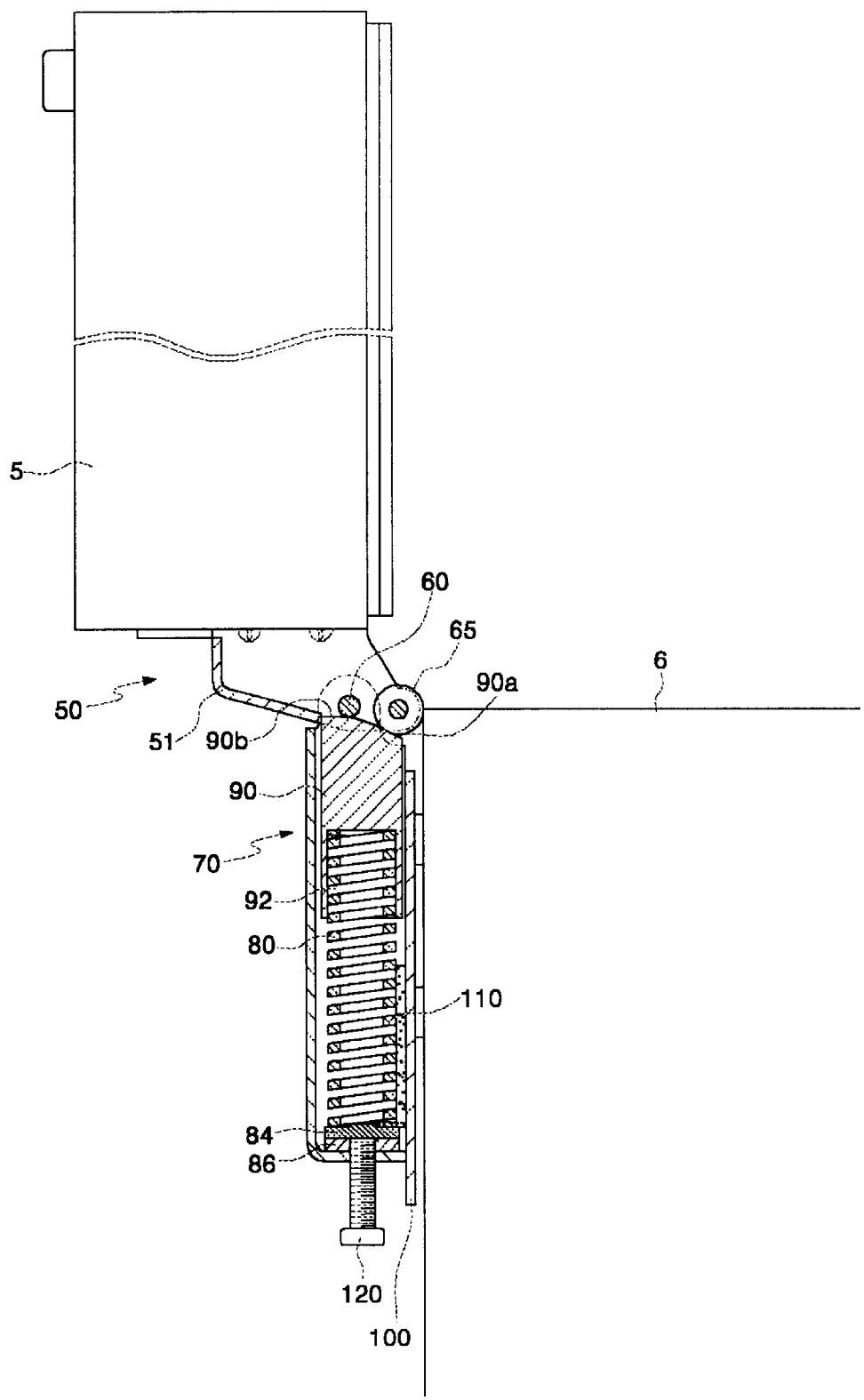
FIGS. 6 and 7 are plane partial cutaway views of the storage employing a hinge assembly according to the first embodiment of the present invention.
Figure 7:
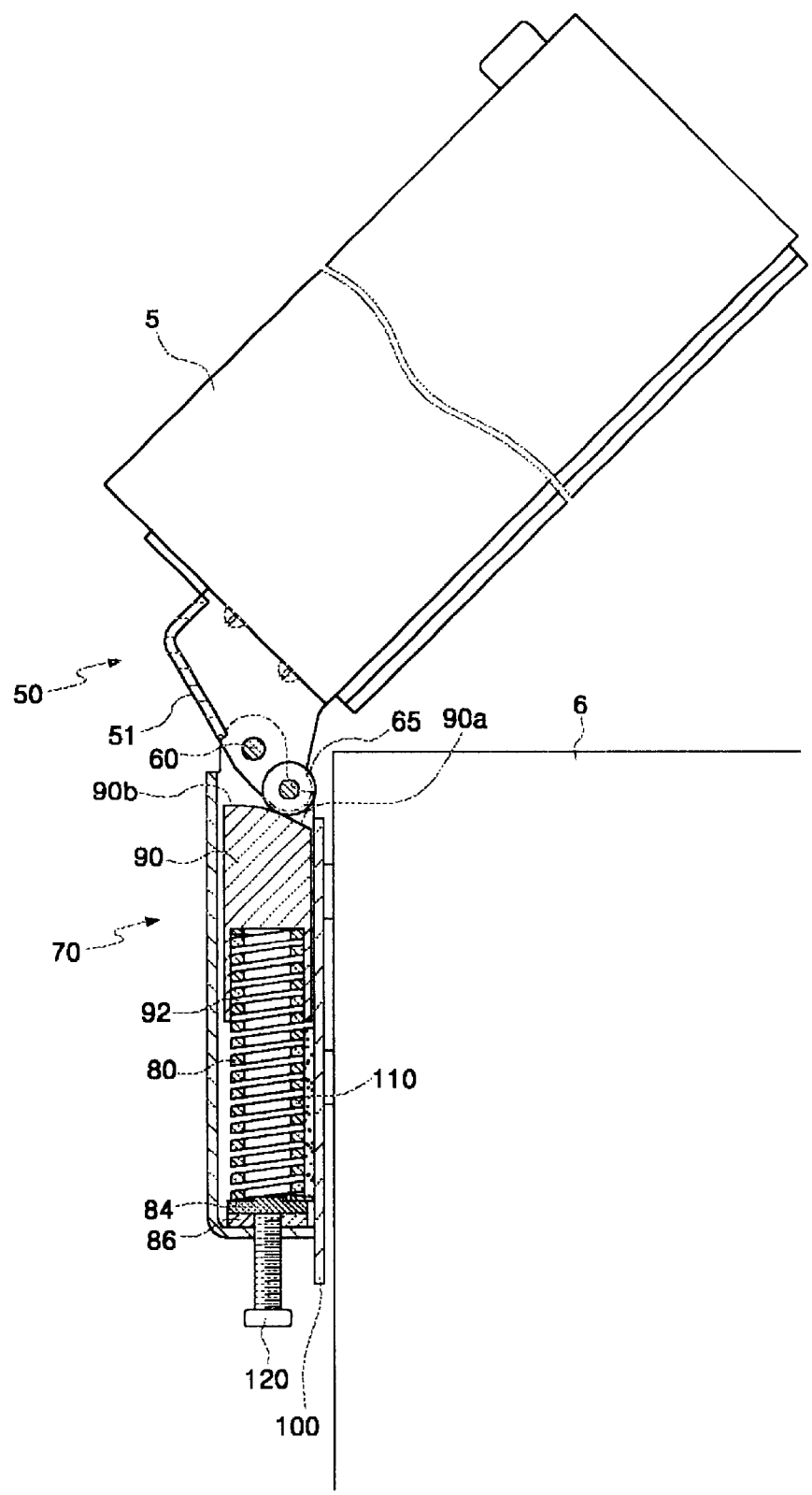

FIGS. 6 and 7 are views illustrating the state that the hinge assembly is fixed to the storage according to the first embodiment of the present invention. Referring to this, the assembling state and operational effect of the present invention will now be described.

The turn member 50 is fixed and mounted to the back region of the door 5 through the door support flange 52 by a screw assembly. The cover plate 100 covering an open surface of the hinge housing 70 by engagement is fixed and mounted to the upper end of the rear surface of the body 6 through the body support flange 102 by a screw assembly.

In this way, in the state that the turn member 50 and hinge housing 70 of the hinge assembly are assembled, the turn member 50 fixed to the door 5 side is moved backwardly toward the fully open position when opening the door 5. When the door 5 is fully open, the turn member 50 is moved backwardly at an angle of up to 90 degrees with respect to the upper end of the body 6, and then is rotated no more by the contact between the outer surface of the turn member body 51 and the outer surface of the hinge housing 70.

Furthermore, as illustrated in FIG. 7, in the case of closing the door 5, the turn member 50 is moved forwardly toward the fully closed position and then the press member 65 is slidably moved in the compartment 70a of the hinge housing 70 while maintaining a rolling contact with the sloping contact surface of the support member 90.

At this time, the press member 65, which is contacted on the first contact surface 90a of the sloping contact surface when the door 5 is brought to the fully open position, is gradually slided on the second contact surface 90b as the door 5 is closed. Due to the sloping shape of the sloping contact surface, resultantly, the press member 65 presses the support member 90 downwardly and thus the spring member 80 connected with the support member 90 receives a compression force.

As the door 5 comes to the closed position closer, the compression force applied to the spring member 80 through the support member 90 becomes larger and accordingly the springback force of the spring member 80 also becomes larger.

In addition, since the sloping contact surface of the support member 90 is curved at multiple angles, it is prevented that the press member 65 returns to the first contact surface 90a from the second contact surface 90b without an external force even if the external force was removed during the closing operation of the door 5.

Therefore, it is possible to maintain a gas tight and thus prevent the leakage of cold air, when the door 5 is in the fully open position. If the movement of the door 5 is stopped during opening and closing operations, stable opening and closing operations of the door 5 are achieved by the springback force of the spring member 80.

Moreover, as the door 5 is closed, the resistance by the springback force of the spring member 80 is increased for thereby decreasing the closing speed of the door 5. Hence, by the time the door 5 is contacted to the body 6, the closing speed of the door 5 is drastically reduced to thus alleviate an impact.

In the case that the springback force of the spring member 80 is weak and thus the force supporting the door 5 is also weak, the springback force of the spring member 80 can be controlled by clamping the adjusting screw 120.

Figure 8:
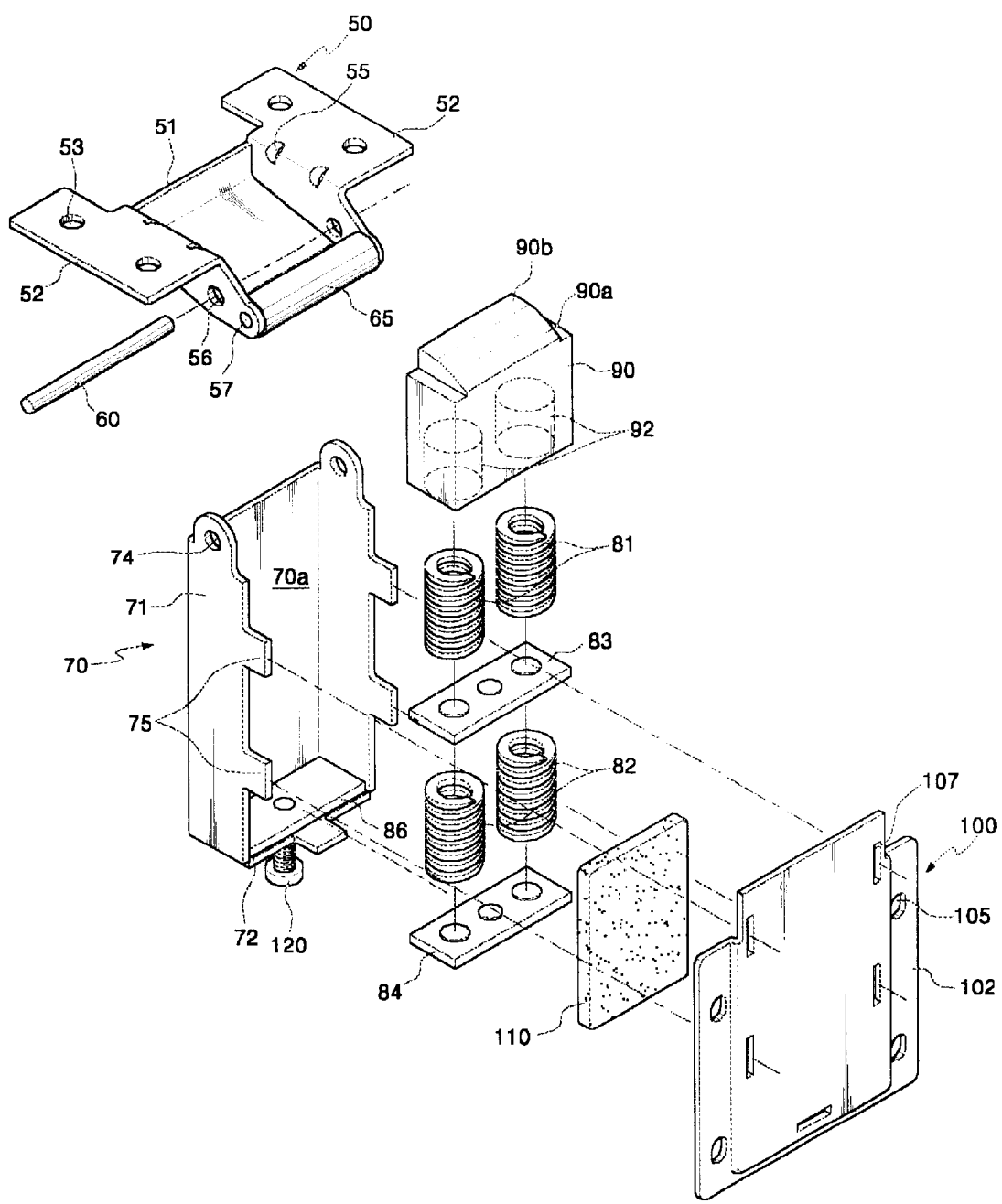
FIG. 8 is a perspective assembly view of a hinge assembly according to a second embodiment of the present invention.

Next, FIG. 8 illustrates a perspective assembly view of a hinge assembly according to a second embodiment of the present invention.

As illustrated therein, the hinge assembly according to the present invention includes a turn member 50 fixed to the door side, a hinge housing 70 forming a compartment 70a in a case shape, a roller-shaped press member 65 disposed at the turn member 50, a hexahedral support member 90 and an elastic means with first and second spring members 81 and 82 interconnected by the medium of a connection plate 83, said support member 90 and elastic means being placed in the compartment 70a of the hinge housing 70, a support plate 86, a control plate 84, and a cover plate 100 fixed to the body.

That is to say, the constitution of the second embodiment is identical to that of the first embodiment excepting the elastic means.

The turn member 50 fixed to the door side has a turn member body 51 with a door support flange 52 extending from the both ends of the turn member body 51 in a direction approximately perpendicular to opposite ends of the body 51 in spaced parallel relation. At the door support flange 52, first and second screw holes 53 for screwing fastening screw(s) are formed. At the portion horizontally extended and connected from the turn member body 51 to the door support flange 52 at a right angle, first and second reinforcing ribs 55 are formed to increase strength.

At lateral sides of the turn member body 51, first and second axial coupling holes 56 for coupling the hinge axis rotatable with the hinge housing 70 are formed. At the front end of the lateral sides, first and second pin holes 57 for rotatably coupling the roller-shaped press member 65 are formed.

The hinge housing 70 has a shape of an approximately cut case in which lateral sides 71 and a lower side 72 form a right angle, of which one side being open for hinge coupling with the turn member 50 and being formed with a projection that is curved and has an axial hole 74 at the edge of the lateral side 71. Along the front section of the lateral side 71, a plurality of engagement ribs 75 for engaging with the cover plate 100 are extruded integrally at predetermined intervals. At the lower side 72 of the hinge housing 70, an adjusting screw hole is formed in order to insert an adjusting screw 120.

The opened portion of the hinge housing 70 contains the portion having the axial coupling hole 56 of the turn member body 51. The hinge axis 60 passes through the turn member 50 via the axial coupling hole 56 of the turn member body 51 from the axial hole 74 of the hinge housing and then is coupled to the axial coupling hole 56 of the other side via the other axial hole 74 of the hinge housing 70. At this time, a washer is inserted between those bodies through which the hinge axis passes in consideration of friction and axial directional movement.

The thusly assembled hinge axis 60 serves as a turn axis of a door.

According to the above structure, by coupling the turn member 50 and the hinge housing 70 by the hinge axis 60, the turn member 50 becomes rotatable within a predetermined angle. Once the turn member 50 is moved toward the open position at an angle of up to 90 degrees and is rotated, it is rotated no more as outer surfaces of the turn member body 51 and hinge housing 70 are contacted with one another.

In addition, the roller-shaped press member 65 is rotatably coupled by an engaging pin between the pin holes 57 formed at the front end of the lateral sides of the turn member 50, that is, at the front end spaced at a predetennined distance from the axial coupling hole 56 assembled with the hinge axis 60. The width between the lateral sides of the turn member 50 to which the press member 65 is coupled must be smaller than the width of the compartment 70a formed between the lateral sides of the hinge housing 70.

Moreover, the compartment 70a of the hinge housing 70 is provided with a two-stage elastic means in which first and second spring members 81 and 82 with a springback force are serially connected by the medium of a connection plate 83, a hexagonal support member 90 having a spring insertion hole 92 for insert-coupling one end of the first spring member 81 while containing it and having a sloping contact surface curved at multiple angles, a support plate 86 for backing up the other free end of the second spring member 82 and a control plate 84 for controlling the force of the elastic means.

The elastic means consists of one pair of first spring members 81 and the other pair of second spring members 82. At this time, the spring constant of the first spring member 81 is different from that of the second spring member 82. The spring members each are formed in a serial structure with the connection plate 83 therebetween.

At this time, as viewed from the connection plate 83, the spring constant of the first spring member 81 connected to the spring insertion hole 92 of the support member 90 is smaller than that of the second spring member 82 connected to the control plate 84.

The sloping contact surface of the support member 90 becomes sloped as the height of a second contact surface 90b at the back becomes larger than that of a first contact surface 90a of the front when viewed from the front side, and it is contacted with the roller-shaped press member 65 connected to the front end of the turn member 50. At the rotation of the turn member 50, the press member 65 is slidably moved along the sloping contact surface of the support member 90 while maintaining a rolling contact and applies a force to the support member 90 supported by the first spring member 81 of the elastic means due to the shape of the sloping contact surface.

At this time, it is preferable that the press member 65 and the support member 90 are manufactured by using resin material with excellent durability so that a frictional force can be minimized and a sliding motion can be easily performed.

The springback force of the elastic means can be controlled by the control plate 84 by clamping or unclamping the adjusting screw. When clamping the adjusting screw 120 coupled to the adjusting screw hole formed at the support plate 86 and the lower side 72 of the hinge housing 70, the control plate 84 is pushed upwardly to apply a force to the elastic means and compress it, for thereby increasing the springback force of the elastic means.

The surfaces of the hinge housing 70 containing the elastic means, the support member 90 and the like in the compartment 70a are covered by the cover plate 100.

At this time, the cover plate 100 serves to cover an open inner region of the hinge housing 70 and at the same time fix the hinge housing 70 to the body of the kimchi storage device, and it is provided with an engagement groove 107 for insertingly engaging a plurality of engaging ribs 75 extruded integrally along the front section of the lateral sides 71 of the hinge housing 70 and a body support flange 102 having a plurality of screw holes 105 for a screw assembly with the body of the kimchi storage device.

At this time, it is preferred that a buffer member 110 made of sponge material is inserted between the elastic means in the hinge housing 70 and the cover plate 100 in order to prevent a contact friction between the elastic means of which motion is relatively frequently changed and the inner surface of the cover plate 100 during the opening and closing of the door.

Furthermore, after the engagement groove 107 of the cover plate 100 is insertingly engaged to the engaging rib 75 of the hinge housing 70, the engaging rib 75 portion extruded to the outer surface of the cover plate 100 is pressed so that it can be contacted with the outer surface of the cover plate 100 in parallel, thereby increasing the robustness of the engagement and making the engaging rib 75 easily fixed and mounted to the flat rear surface of the body of the kimchi storage device.

Figure 9:
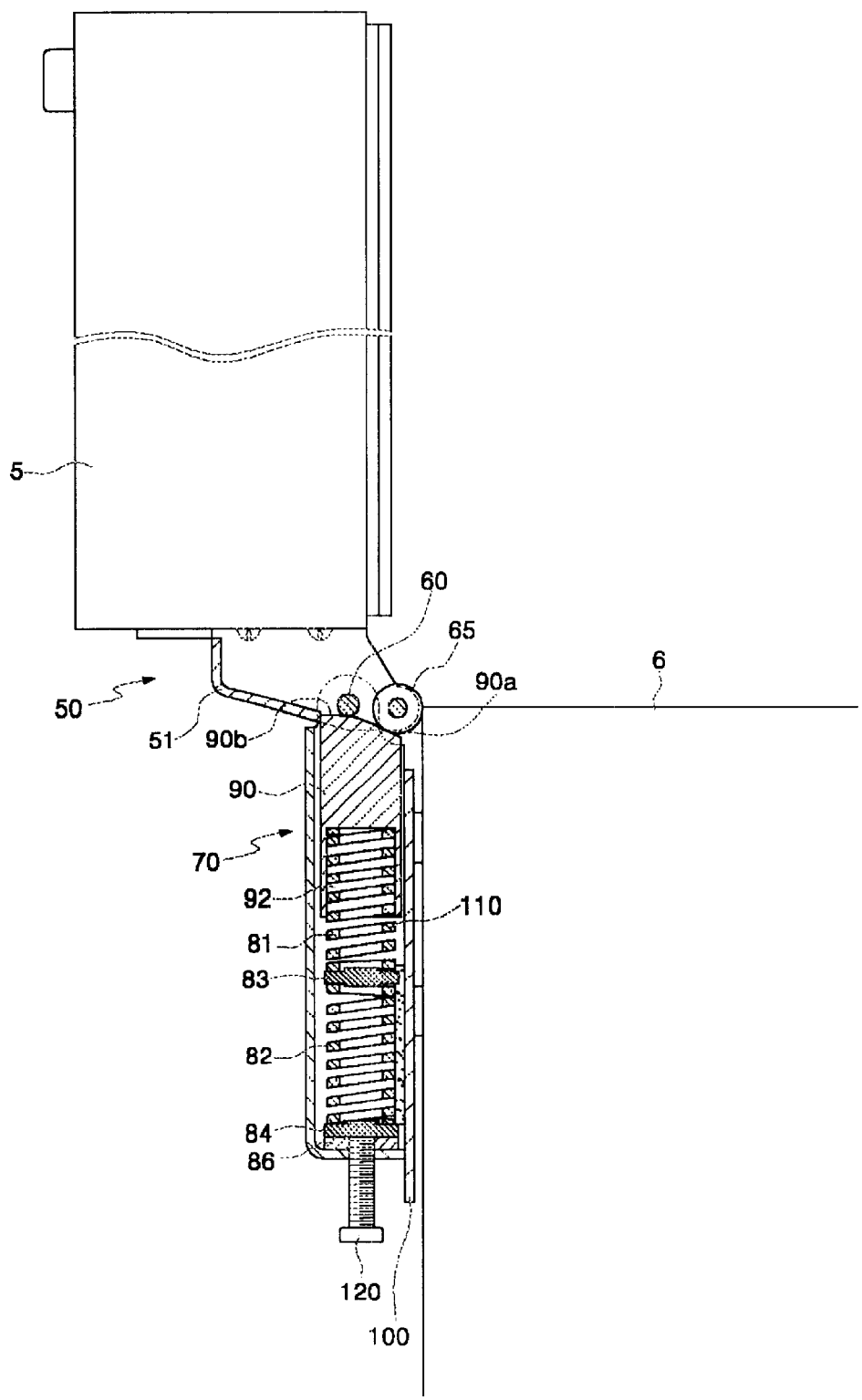
FIGS. 9 and 10 are plane partial cutaway views of the storage employing a hinge assembly according to the second embodiment of the present invention.
Figure 10:
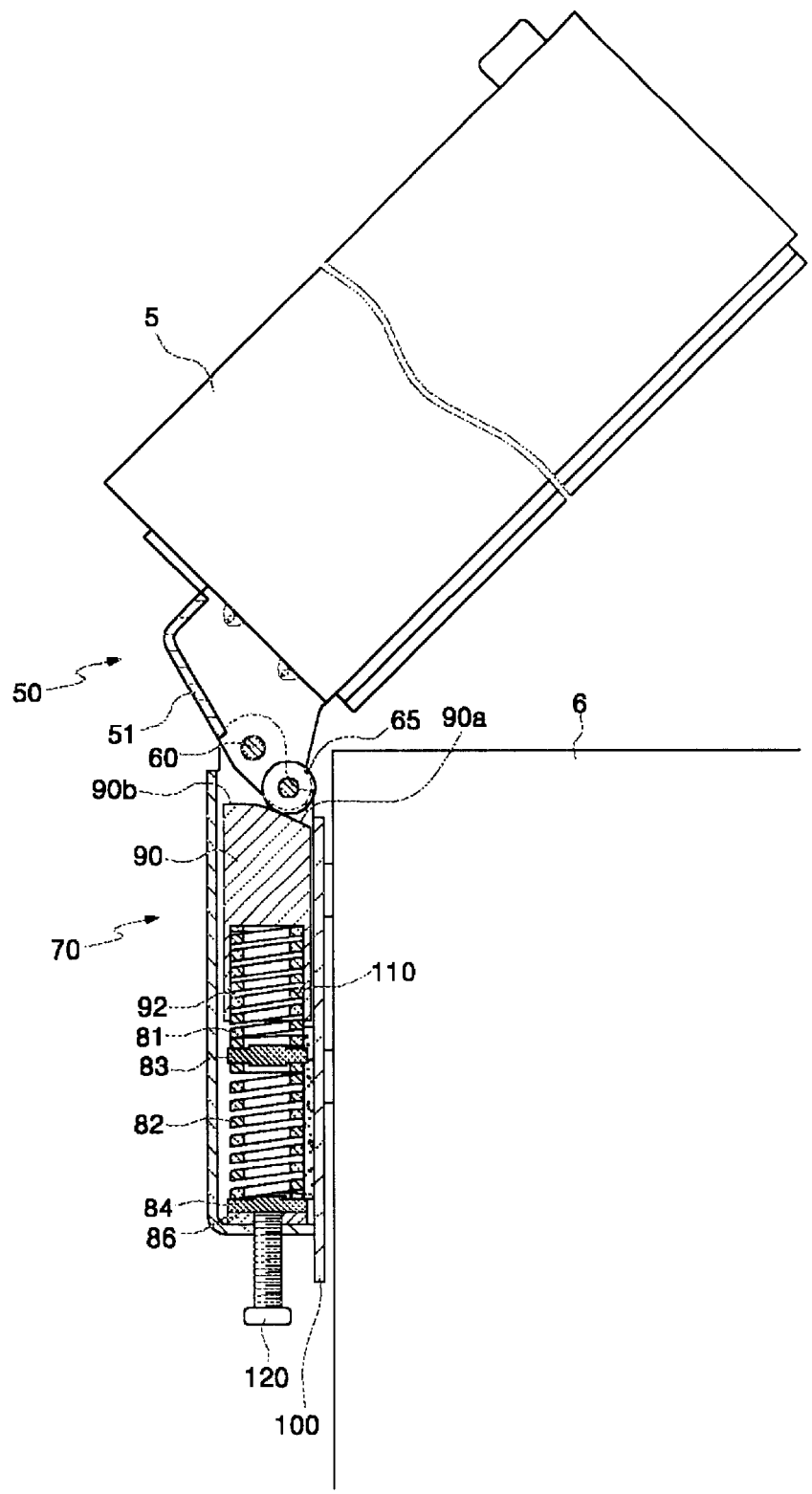

FIGS. 9 and 10 are views illustrating the state that the hinge assembly is fixed to the storage according to the second embodiment of the present invention. Referring to this, the assembling state and operational effect of the present invention will now be described.

The turn member 50 is fixed and mounted to the back region of the door 5 through the door support flange 52 by a screw assembly. The cover plate 100 covering an open surface of the hinge housing 70 by engagement is fixed and mounted to the upper end of the rear surface of the body 6 through the body support flange 102 by a screw assembly.

In this way, in the state that the turn member 50 and hinge housing 70 of the hinge assembly are assembled, the turn member 50 fixed to the door 5 side is moved backwardly toward the fully open position when opening the door 5. When the door 5 is fully open, the turn member 50 is moved backwardly at an angle of up to 90 degrees with respect to the upper end of the body 6, and then is rotated no more by the contact between the outer surface of the turn member body 51 and the outer surface of the hinge housing 70.

Furthermore, as illustrated in FIG. 10, in the case of closing the door 5, the turn member 50 is moved forwardly toward the fully closed position and then the press member 65 is slidably moved in the compartment 70a of the hinge housing 70 while maintaining a rolling contact with the sloping contact surface of the support member 90.

At this time, the press member 65, which is contacted on the first contact surface 90a when the door 5 is brought to the fully open position, is gradually slided on the second contact surface 90b as the door 5 is closed. Due to the sloping shape of the sloping contact surface, resultantly, the press member 65 presses the support member 90 downwardly and thus the elastic means connected with the support member 90 receives a compression force.

As the door 5 comes to the closed position closer, the compression force applied to the elastic means through the support member 90 becomes larger and accordingly the springback force of the elastic means also becomes larger.

In addition, since the sloping contact surface of the support member 90 is curved at multiple angles, it is prevented that the press member 65 returns to the first contact surface 90a from the second contact surface 90b without an external force even if the external force was removed during the closing operation of the door 5.

Therefore, it is possible to maintain a gas tight and thus prevent the leakage of cold air, when the door 5 is in the fully open position. If the movement of the door 5 is stopped during opening and closing operations, stable opening and closing operations of the door 5 are achieved by the springback force of the elastic means.

Moreover, as the door 5 is closed, the resistance by the springback force of the elastic means is increased for thereby decreasing the closing speed of the door 5. Hence, by the time the door 5 is contacted to the body 6, the closing speed of the door 5 is drastically reduced to thus alleviate an impact.

Therefore, the larger the spring constant of the elastic means becomes, the larger the resistance by the springback force of the elastic means becomes to thus alleviate an impact much more during the door closing operation. On the contrary, during the door opening operation, the door 5 is opened by the force as large as the resistance for thereby increasing an opening impact.

Thus, the spring members with different spring constants are formed in two stages by connecting them in series.

In other words, in the case of closing the door 5, as the first spring member 81 with a smaller spring constant connected to the support member 90 is firstly compressed to receive a force. As the door 5 become closer and closer to the closed position, the second spring member 82 with a larger spring constant connected by the medium of the connection plate 83 is compressed after the first spring member 81 is sufficiently compressed.

Hence, at the time the door 5 is contacted to the body 6, the resistance by the springback force of the second spring member 82 with a larger spring constant is applied to thus alleviate the closing speed of the door 5 much more, thereby making the door closed stably and without giving an impact.

On the other hand, in the case of opening the door 5, the resistance of the second spring member 82 with a larger spring constant is applied to thus open the door by a larger force. However, as the opening operation proceeds and the latter half of the operation comes, the resistance of the first spring member 81 with a smaller spring constant is applied to thus alleviate the opening speed during the fully opening operation of the door 5.

The e above-mentioned elastic means formed in two stages with a serial structure is constituted to be stable and to alleviate the impact during both door opening and closing operations.

In the case that the springback force of the elastic means is weak and thus the force supporting the door 5 is also weak, the springback force of the elastic means can be controlled by clamping the adjusting screw 120.

Hereinafter, a third embodiment of the present invention will now be described in detail with reference to the accompanying drawings.

Figure 11:
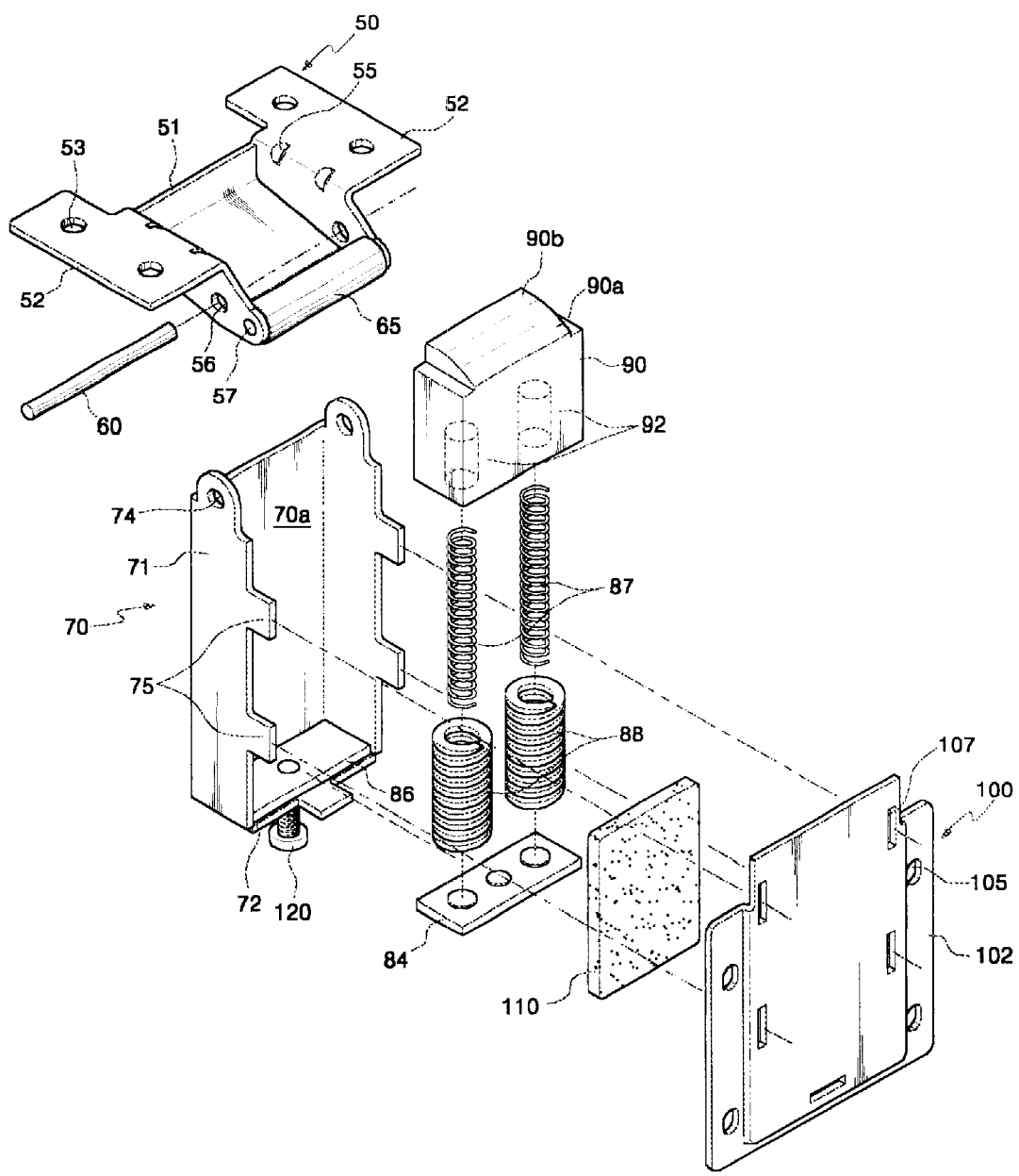
FIG. 11 is a perspective assembly view of a hinge assembly according to a third embodiment of the present invention.

FIG. 11 illustrates a perspective assembly view of a hinge assembly according to the third embodiment of the present invention.

As illustrated therein, the hinge assembly according to the present invention includes a turn member 50 fixed to the door side, a hinge housing 70 forming a compartment 70a in a case shape, a roller-shaped press member 65 disposed at the turn member 50, a hexahedral support member 90 and an elastic means with a dual structure consisting of third and fourth spring members 87 and 88 interconnected by the medium of a connection plate 83, said support member 90 and elastic means being placed in the compartment 70a of the hinge housing 70, a support plate 86, a control plate 84, and a cover plate 100 fixed to the body.

That is to say, the constitution of the second embodiment is identical to that of the first embodiment excepting the elastic means.

The turn member 50 fixed to the door side has a turn member body 51 with a door support flange 52 extending from the both ends of the turn member body 51 in a direction approximately perpendicular to opposite ends of the body 51 in spaced parallel relation. At the door support flange 52, first and second screw holes 53 for screwing fastening screw(s) are formed. At the portion horizontally extended and connected from the turn member body 51 to the door support flange 52 at a right angle, first and second reinforcing ribs 55 are formed to increase strength.

At lateral sides of the turn member body 51, first and second axial coupling holes 56 for coupling the hinge axis rotatable with the hinge housing 70 are formed. At the front end of the lateral sides, first and second pin holes 57 for rotatably coupling the roller-shaped press member 65 are formed.

The hinge housing 70 has a shape of an approximately cut case in which lateral sides 71 and a lower side 72 form a right angle, of which one side being open for hinge coupling with the turn member 50 and being formed with a projection that is curved and has an axial hole 74 at the edge of the lateral side 71. Along the front section of the lateral side 71, a plurality of engagement ribs 75 for engaging with the cover plate 100 are extruded integrally at predetermined intervals.

At the lower side 72 of the hinge housing 70, an adjusting screw hole is formed in order to insert an adjusting screw 120.

The opened portion of the hinge housing 70 contains the portion having the axial coupling hole 56 of the turn member body 51. The hinge axis 60 passes through the turn member 50 via the axial coupling hole 56 of the turn member body 51 from the axial hole 74 of the hinge housing and then is coupled to the axial coupling hole 56 of the other side via the other axial hole 74 of the hinge housing 70.

At this time, a washer is inserted between those bodies through which the hinge axis passes in consideration of friction and axial directional movement.

The thusly assembled hinge axis 60 serves as a turn axis of a door.

According to the above structure, by coupling the turn member 50 and the hinge housing 70 by the hinge axis 60, the turn member 50 becomes rotatable within a predetermined angle. Once the turn member 50 is moved toward the open position at an angle of up to 90 degrees and is rotated, it is rotated no more as outer surfaces of the turn member body 51 and hinge housing 70 are contacted with one another.

In addition, the roller-shaped press member 65 is rotatably coupled by an engaging pin between the pin holes 57 formed at the front end of the lateral sides of the turn member 50, that is, at the front end spaced at a predetermined distance from the axial coupling hole 56 assembled with the hinge axis 60.

The width between the lateral sides of the turn member 50 to which the press member 65 is coupled must be smaller than the width of the compartment 70*a* formed between the lateral sides of the hinge housing 70.

Moreover, the compartment 70*a* of the hinge housing 70 is provided with a elastic means with a dual structure consisting of third and fourth spring members 87 and 88 with a springback force are serially connected by the medium of a connection plate 83, a hexagonal support member 90 having a spring insertion hole 92 for insert-coupling one end of the elastic means while containing it and having a sloping contact surface curved at multiple angles, a support plate 86 for backing up the other free end of the second spring member 82 and a control plate 84 for controlling the force of the elastic means.

The elastic means consists of two pairs of spring members with different spring constants, and it is constituted in such a manner that one pair of first spring members 81 with a smaller spring constant, a smaller outer diameter than the inner diameter of a second spring member 82 and a larger length are inserted into one pair of second spring members 82 with a larger outer diameter, a larger spring constant and a smaller length.

The sloping contact surface of the support member 90 becomes higher as it goes toward a second contact surface 90*b* at the back from a first contact surface 90*a* of the front when viewed from the front side, thereby forming a sloping, continuous screw shape, and it is contacted with the roller-shaped press member 65 connected to the front end of the turn member 50. At the rotation of the turn member 50, the press member 65 is slidably moved along the sloping contact surface of the support member 90 while maintaining a rolling contact and applies a force to the support member 90 supported by the elastic means due to the shape of the sloping contact surface.

At this time, it is preferable that the press member 65 and the support member 90 are manufactured by using resin material with excellent durability so that a frictional force can be minimized and a sliding motion can be easily performed.

The springback force of the elastic means can be controlled by the control plate 84 by clamping or unclamping the adjusting screw. When clamping the adjusting screw 120 coupled to the adjusting screw hole formed at the support plate 86 and the lower side 72 of the hinge housing 70, the control plate 84 is pushed upwardly to apply a force to the elastic means and compress it, for thereby increasing the springback force of the elastic means.

The surfaces of the hinge housing 70 containing the elastic means, the support member 90 and the like in the compartment 70*a* are covered by the cover plate 100.

At this time, the cover plate 100 serves to cover an open inner region of the hinge housing 70 and at the same time fix the hinge housing 70 to the body of the kimchi storage device, and it is provided with an engagement groove 107 for insertingly engaging a plurality of engaging ribs 75 extruded integrally along the front section of the lateral sides 71 of the hinge housing 70 and a body support flange 102 having a plurality of screw holes 105 for a screw assembly with the body of the kimchi storage device.

At this time, it is preferred that a buffer member 110 made of sponge material is inserted between the elastic means in the hinge housing 70 and the cover plate 100 in order to prevent a contact friction between the elastic means of which motion is relatively frequently changed and the inner surface of the cover plate 100 during the opening and closing of the door.

Furthermore, after the engagement groove 107 of the cover plate 100 is insertingly engaged to the engaging rib 75 of the hinge housing 70, the engaging rib 75 portion extruded to the outer surface of the cover plate 100 is pressed so that it can be contacted with the outer surface of the cover plate 100 in parallel, thereby increasing the robustness of the engagement and making the engaging rib 75 easily fixed and mounted to the flat rear surface of the body of the kimchi storage device.

Figure 12:
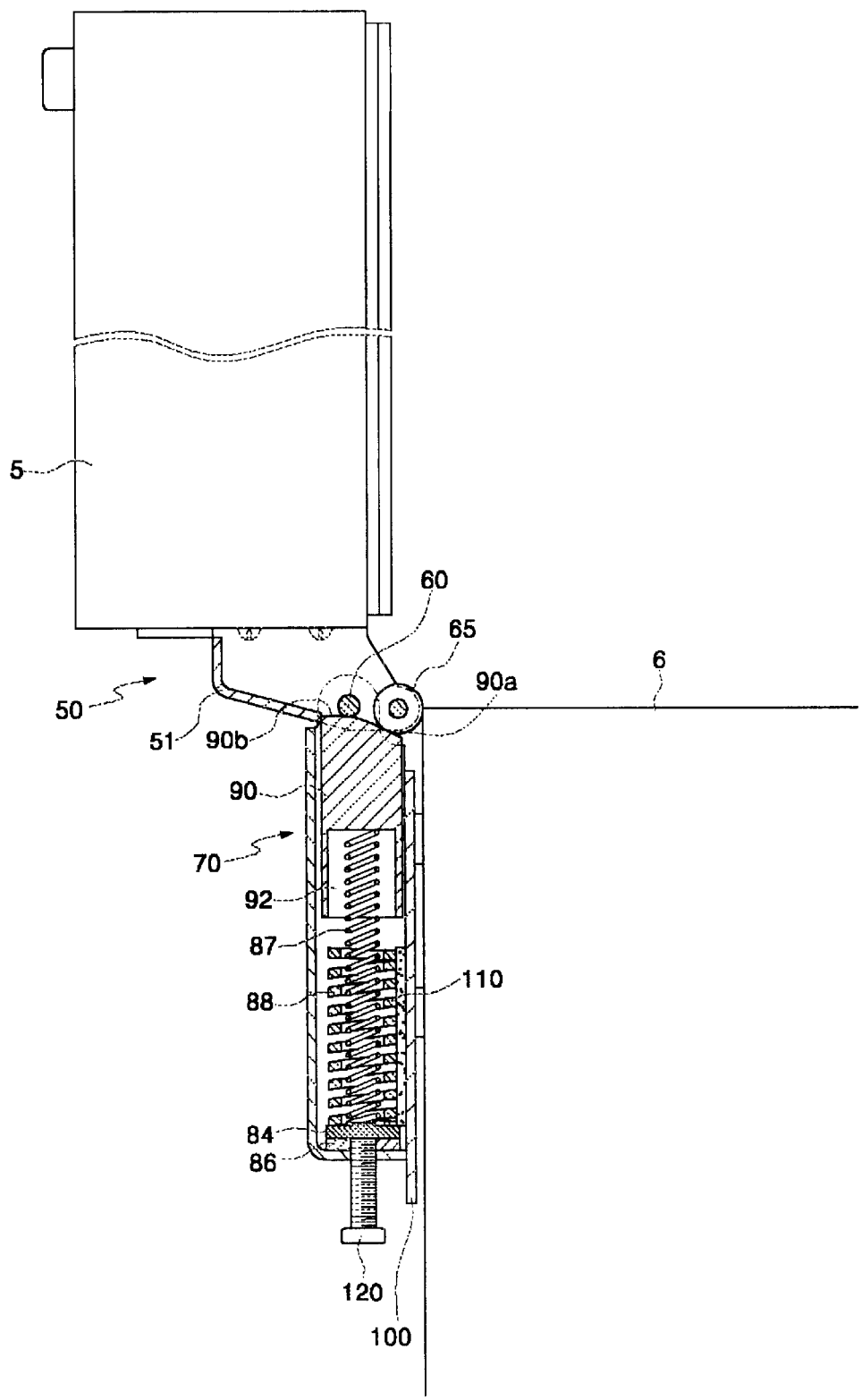
FIGS. 12 and 13 are partial cutaway plane views of the storage employing a hinge assembly according to the second embodiment of the present invention.
Figure 13:
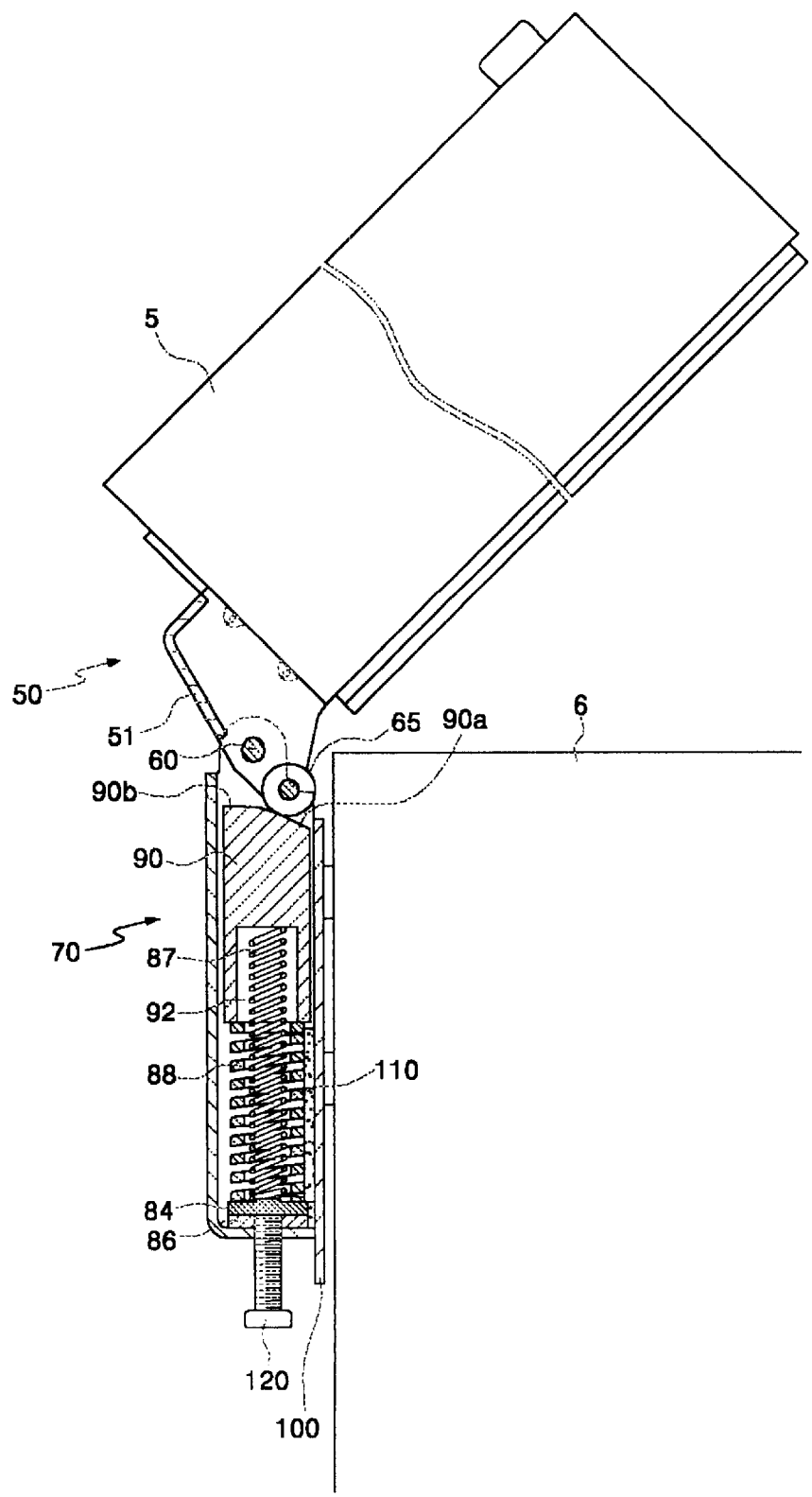

FIGS. 12 and 13 are views illustrating the state that the hinge assembly is fixed to the storage according to the third embodiment of the present invention. Referring to this, the assembling state and operational effect of the present invention will now be described.

The turn member 50 is fixed and mounted to the back region of the door 5 through the door support flange 52 by a screw assembly. The cover plate 100 covering an open surface of the hinge housing 70 by engagement is fixed and mounted to the upper end of the rear surface of the body 6 through the body support flange 102 by a screw assembly.

In this way, in the state that the turn member 50 and hinge housing 70 of the hinge assembly are assembled, the turn member 50 fixed to the door 5 side is moved backwardly toward the fully open position when opening the door 5. When the door 5 is fully open, the turn member 50 is moved backwardly at an angle of up to 90 degrees with respect to the upper end of the body 6, and then is rotated no more by the contact between the outer surface of the turn member body 51 and the outer surface of the hinge housing 70.

Furthermore, as illustrated in FIG. 13, in the case of closing the door 5, the turn member 50 is moved forwardly toward the fully closed position and then the press member 65 is slidably moved in the compartment 70a of the hinge housing 70 while maintaining a rolling contact with the sloping contact surface of the support member 90.

At this time, the press member 65, which is contacted on the first contact surface 90a when the door 5 is brought to the fully open position, is gradually slided on the second contact surface 90b as the door 5 is closed. Due to the sloping shape of the sloping contact surface, resultantly, the press member 65 presses the support member 90 downwardly and thus the elastic means connected with the support member 90 receives a compression force.

As the door 5 comes to the closed position closer, the compression force applied to the elastic means through the support member 90 becomes larger and accordingly the springback force of the elastic means also becomes larger.

In addition, since the sloping contact surface of the support member 90 is curved at multiple angles, it is prevented that the press member 65 returns to the first contact surface 90a from the second contact surface 90b without an external force even if the external force was removed during the closing operation of the door 5.

Therefore, it is possible to maintain a gas tight and thus prevent the leakage of cold air, when the door 5 is in the fully open position. If the movement of the door 5 is stopped during opening and closing operations, stable opening and closing operations of the door 5 are achieved by the springback force of the elastic means.

Moreover, as the door 5 is closed, the resistance by the springback force of the elastic means is increased for thereby decreasing the closing speed of the door 5. Hence, by the time the door 5 is contacted to the body 6, the closing speed of the door 5 is drastically reduced to thus alleviate an impact.

Therefore, the larger the spring constant of the elastic means becomes, the larger the resistance by the springback force of the elastic means becomes to thus alleviate an impact much more during the door closing operation. On the contrary, during the door opening operation, the door 5 is opened by the force as large as the resistance for thereby increasing an opening impact.

Thus, the third and fourth spring members 87 and 88 with different spring constants are formed in a dual structure.

In other words, in the case of closing the door 5, as the third spring member 87 with a smaller spring constant and a large strength that is extruded to be connected to the support member 90 is firstly compressed to receive a force. As the door 5 become closer and closer to the closed position, the support member 90 is contacted to the fourth spring member 88 with a larger spring constant to thus be compressed after the third spring member 87 is sufficiently compressed.

Hence, at the time the door 5 is contacted to the body 6, the resistance by the springback force of the fourth spring member 88 with a larger spring constant is applied to thus alleviate the closing speed of the door 5 much more, thereby making the door closed stably and without giving an impact.

On the other hand, in the case of opening the door 5, the resistance of the fourth spring member 88 with a larger spring constant is applied to thus open the door by a larger force. However, as the opening operation proceeds and the latter half of the operation comes, the resistance of the third spring member 87 with a smaller spring constant is applied to thus alleviate the opening speed during the fully opening operation of the door 5.

The above-described elastic means formed in a dual structure is constituted to be stable and to alleviate the impact during both door opening and closing operations.

In the case that the springback force of the elastic means is weak and thus the force supporting the door 5 is also weak, the springback force of the elastic means can be controlled by clamping the adjusting screw 120.

As describe above, according to the hinge assembly for hinge-coupling a door rotated in one direction and opening and closing a storage chamber to the upper surface of the body of the kimchi storage device according to the present invention, there is no need to prepare a hinge joint when forming the body or the door and the body and the door can be hinge-coupled by simply assembling and mounting the hinge assembly to the body of the kimchi storage device without adding any outer case and elements. Thus, the production efficiency can be improved by a process simpler than the conventional production process, and the opening and closing impact of the door can be prevented to thus enable stable opening and closing operations by preventing the lateral movement of the door and alleviating the opening and closing speed of the door by the springback force of the spring member.

What is claimed is:

1. A kimchi storage device having a body formed with at least one storage chamber, an upper door rotatably disposed at the upper portion of the body through a hinge assembly and opening and closing the storage chamber and a cooling machine and heating machine for maturing and cooling kimchi in the storage chamber, the hinge assembly for a door, the hinge assembly comprising:

a hinge housing fixed to one side of the body through a cover plate coupled to cover a compartment of which one side is open;

a turn member fixed to the rear surface of the door and at the same time rotatably coupled to the upper end of the hinge housing by inserting a hinge axis into one end of said turn member;

a roller-shaped press member rotatably disposed at the upper end of the turn member through a roller axis;

a support member slidably contacted to the press member through a polygonal sloping contact surface, disposed in the compartment of the hinge housing and formed with a spring insertion hole at the other side of the sloping contact surface;

a pair of spring members inserted into the spring insertion hole of the support member in order to press the support member with respect to the press member; and a control plate operationally coupled to an adjusting screw penetratingly disposed outwardly of the hinge housing in order to control the springback force of the spring member while supporting the lower portion of the elastic means.

2. The hinge assembly of claim 1, wherein the turn member is fixed to the rear surface of the door through a door support flange extended to both sides, one end of the turn member at which the hinge axis and the press member are assembled being inserted into the compartment of the hinge housing, the hinge housing having an axial hole for coupling the hinge axis at one edge portion of lateral sides of the compartment and a plurality of engaging ribs for engaging the cover plate that are extruded integrally along both front sections of the compartment.

3. The hinge assembly of claim 1, wherein the sloping contact surface of the support member consists of first and second contact surfaces, the first and second contact surfaces being formed integrally as a continuous, screw-type sloping surface.

4. A kimchi storage having a body formed with at least one storage chamber and an upper open/shut type door rotatably opening and closing the storage chamber, wherein the body and the door being hinge-coupled, the hinge assembly comprising:

a hinge housing fixed to one side of the body through a cover plate coupled to cover a compartment of which one side is open;

a rotary member fixed to the rear surface of the door, rotatably coupled to the hinge housing by the medium of a hinge axis and having a compartment of which one side is open;

a roller-shaped press member rotatably disposed at one free end portion of the rotary member;

a support member having a sloping contact surface for enabling a sliding motion by maintaining a rolling contact with the press member in the compartment of the hinge housing and having a spring insertion hole at the opposite side of the sloping contact surface;

an elastic means consisting of a pair of first spring members inserted into the spring insertion hole of the support member and a pair of second spring members connected to the first spring members in series by the medium of a connection plate; and a control panel operationally coupled to an adjusting screw penetratingly disposed outwardly of the hinge housing in order to control the springback force of the elastic means while supporting the lower portion of the elastic means.

5. The hinge assembly of claim 4, wherein the spring constant of the first spring member is smaller than that of the second spring member.

6. The hinge assembly of claim 4, wherein the rotary member is fixed to the rear surface of the door through a door support flange extended to both sides, one free end portion of the rotary member at which the hinge axis and the press member are assembled being inserted into the compartment of the hinge housing, the hinge housing having an axial hole for coupling the hinge axis at one edge portion of lateral sides of the compartment and a plurality of engaging ribs for engaging the cover plate that are extruded integrally along both front sections of the compartment.

7. The hinge assembly of claim 4, wherein the sloping contact surface of the support member consists of first and second contact surfaces, the first and second contact surfaces being formed integrally as a continuous, screw-type sloping surface.

8. A kimchi storage having a body formed with at least one storage chamber and an upper open/shut type door rotatably opening and closing the storage chamber, wherein the body and the door being hinge-coupled, the hinge assembly comprising:

a hinge housing fixed to one side of the body through a cover plate coupled to cover a compartment of which one side is open;

a rotary member fixed to the rear surface of the door, rotatably coupled to the hinge housing by the medium of a hinge axis and having a compartment of which one side is open;

a roller-shaped press member rotatably disposed at one free end portion of the rotary member;

a support member having a sloping contact surface for enabling a sliding motion by maintaining a rolling contact with the press member in the compartment of the hinge housing and having a spring insertion hole at the opposite side of the sloping contact surface;

an elastic means formed in a dual structure in which a pair of third spring members inserted into the spring insertion hole of the support member are inserted into a pair of fourth spring members with a smaller length and a larger diameter than the third spring member; and a control panel operationally coupled to an adjusting screw penetratingly disposed outwardly of the hinge housing in order to control the springback force of the elastic means while supporting the lower portion of the elastic means.

9. The hinge assembly of claim 8, wherein the spring constant of the third spring member is smaller than that of the fourth spring member.

10. The hinge assembly of claim 8, wherein the rotary member is fixed to the rear surface of the door through a door support flange extended to both sides, one free end portion of the rotary member at which the hinge axis and the press member are assembled being inserted into the compartment of the hinge housing, the hinge housing having an axial hole for coupling the hinge axis at one edge portion of lateral sides of the compartment and a plurality of engaging ribs for engaging the cover plate that are extruded integrally along both front sections of the compartment.

11. The hinge assembly of claim 8, wherein the sloping contact surface of the support member consists of first and second contact surfaces, the first and second contact surfaces being formed integrally as a continuous, screw-type sloping surface.

* * * * *